United States Patent
Groll

(10) Patent No.: US 7,168,148 B2
(45) Date of Patent: Jan. 30, 2007

(54) COMPOSITE COOKWARE HAVING CERAMIC COATED ALUMINUM EDGES

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 101 days.

(21) Appl. No.: 10/804,813

(22) Filed: Mar. 19, 2004

(65) Prior Publication Data

US 2004/0206744 A1  Oct. 21, 2004

(51) Int. Cl.
- *B23P 19/04* (2006.01)
- *B21D 39/03* (2006.01)
- *A27O 27/00* (2006.01)

(52) U.S. Cl. ............ 29/460; 29/428; 220/573.1

(58) Field of Classification Search ............ 29/460, 29/428; 219/400; 428/677, 674; 220/573.1, 220/573.2
See application file for complete search history.

(56) References Cited

U.S. PATENT DOCUMENTS

| | | | |
|---|---|---|---|
| 3,490,126 A | * | 1/1970 | Miller ............ 428/677 |
| 3,930,806 A | * | 1/1976 | Racz ............ 428/674 |
| 3,952,938 A | | 4/1976 | Ulam |
| 3,966,426 A | | 6/1976 | McCoy et al. |
| 4,167,606 A | | 9/1979 | Ulam |
| 4,246,045 A | | 1/1981 | Ulam |
| 4,646,935 A | | 3/1987 | Ulam |
| 6,197,178 B1 | | 3/2001 | Patel et al. |

FOREIGN PATENT DOCUMENTS

SU  WO200250343  *  6/2002

OTHER PUBLICATIONS

Microplasmic product literature from website www.microplasmic. com, The Microplasmic Process (Jul. 9, 2002).
Mofra Tech product literature from website www.mofratech.com, the ALTIM® process (Apr. 3, 2002).

* cited by examiner

*Primary Examiner*—John C. Hong
(74) *Attorney, Agent, or Firm*—The Webb Law Firm

(57) ABSTRACT

A method of manufacturing composite cookware or bakeware comprising the steps of (a) providing a bonded multi-layer composite sheet of material having at least one layer of an aluminum or aluminum alloy material; (b) forming a cookware vessel of a desired configuration having the aluminum or aluminum alloy layer exposed at least at an edge portion of the formed cookware vessel; and (c) treating at least the exposed edge of aluminum or aluminum alloy by a micro arc oxidation process to form an $Al_2O_3$ coating on at least the exposed edge of aluminum or aluminum alloy whereby chemical corrosion/erosion of the exposed edge by caustic cleaning agents is prevented.

4 Claims, 1 Drawing Sheet

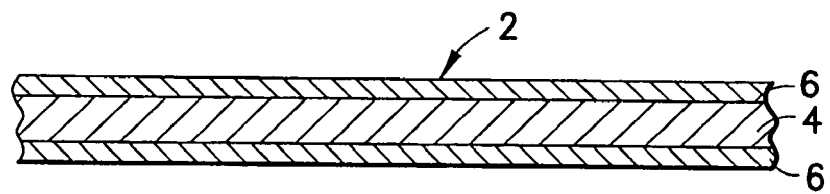
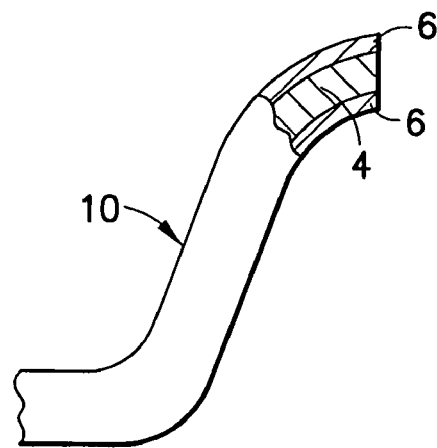
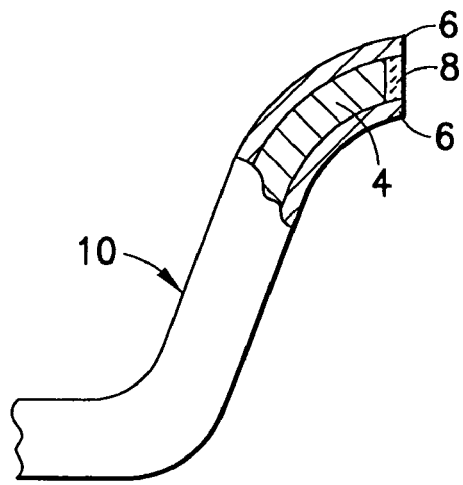

COMPOSITE COOKWARE HAVING CERAMIC COATED ALUMINUM EDGES

BACKGROUND OF THE INVENTION

1. Field of the Invention

The present invention is generally related to multi-layer composite cookware and, more particularly, to a ceramic coating that is selectively applied to protect the exposed edges of an aluminum layer in the composite against the corrosive effects of strong caustic cleaning agents.

2. Description of Related Art

The use of multi-ply composite materials for the manufacture of cooking and baking vessels has been known for approximately the last fifty years. These composite materials often involve highly wear-resistant, corrosion-resistant and chemical attack-resistant materials such as titanium or stainless steel and good heat energy conductors such as aluminum and/or copper. Typically, these materials are bonded together in slab or sheet form using various techniques involving heat, atmospheric control and/or mechanical deformation in the form of hot rolling or pressing. The resulting multi-layer composite may take the form of a flat composite blank which may then be draw formed into a cooking vessel or bonded as a flat composite arrangement on the bottom of a piece of already formed cookware.

The inert nature of stainless steel cooking surfaces combined within the heat buffering effect of the high heat conductor layer make bonded metal cooking and baking utensils superior in performance to single metal utensils, both from a cooking performance standpoint and also in clean-up and long service life. Although copper is considered the most efficient conductor of heat energy of the commercially available metals, aluminum has been the metal of choice for the conductor in most commercial composite cookware and bakeware utensils. This is because aluminum is lighter in weight and is more easily bonded to stainless steel than copper.

The use of interior layers of aluminum in composite cookware and bakeware is not without its drawbacks, however. Exposed aluminum at the edge of a multi-layered composite can be attacked and eroded by strong caustic cleaning agents. The use of such strong caustics is particularly prevalent in Europe and other locales where water conservation is prevalent. Typically, in such places automatic dishwashers use less water and stronger/caustic cleaning agents which accelerate corrosion exposure problems. The presence of this erosion leads to exposed sharp edges of non-eroded stainless steel which may cause a cutting injury to the user. This erosion also weakens the edge of the cooking vessel, leaving it subject to bending. This could be critical in the case of certain vessels, such as a pressure cooker, for example. Solutions to this chemical erosion problem have been developed. One approach is to carefully machine out (cut away) the aluminum from the edge of the pan or vessel and roll the stainless steel over the aluminum layer, thus protecting the aluminum from corrosive caustic solutions. This machining process requires great care and accuracy. The machining is not easily accomplished and is especially difficult to carry out on non-round shapes such as oval, square or rectangular vessels, which naturally cannot be milled and rolled on a rotating lathe.

U.S. Pat. No. 4,646,935 to Ulam, which is incorporated by reference herein, proposes the use of a stainless steel ring fitted around the peripheral edge of an induction cooking utensil to deter corrosion of a carbon steel layer present in the composite.

My invention provides a method to protect the exposed aluminum edge layer of composite cookware against corrosion and erosion. This is accomplished with a form of anodizing known as micro arc oxidation to treat the exposed aluminum edge. This process is commercially practiced by companies such as Mofra Tech and Micro Plasmic Corporation. The coating is applied to the aluminum by an electrochemical dip process and when in place is extremely hard, chemically resistant and has excellent adhesion to the substrate. The dip process allows for the protection of non-round exposed edges which heretofore could not be easily rolled over in the prior art method of protecting the edge by rolling.

Also disclosed is a method of protecting the stainless surfaces of the treated pot or pan from the erosive nature of the electrolyte used in the coating process.

SUMMARY OF THE INVENTION

Briefly stated, my invention is directed to a method of manufacturing composite cookware or bakeware (hereinafter collectively referred to merely as "cookware") which comprises the steps of:

(a) providing a bonded composite sheet of material having at least one layer of an aluminum or aluminum alloy material;

(b) forming a cookware vessel of a desired configuration having said aluminum or aluminum alloy exposed at least at an edge portion of said formed cookware vessel; and (c) treating at least said exposed edge of aluminum or aluminum alloy by a micro arc oxidation process to form an $Al_2O_3$ coating on at least said exposed edge of aluminum or aluminum alloy whereby chemical corrosion/erosion of said exposed edge by caustic cleaning agents is prevented.

BRIEF DESCRIPTION OF THE DRAWINGS

FIG. 1 is a fragmented cross-sectional side view of a multi-layer composite metal sheet for making cookware;

FIG. 2 is an enlarged, fragmented cross-sectional view of the edge of a cookware vessel made from the multi-layer composite of FIG. 1; and FIG. 3 is an exploded view of the cookware edge similar to FIG. 2 showing the exposed aluminum edge after treatment in accordance with the present invention.

DETAILED DESCRIPTION OF THE INVENTION

FIG. 1 depicts an example of a very basic roll bonded multi-layer composite sheet 2 useful in the manufacture of cookware according to the present invention. Composite sheet 2 comprises a core layer 4 of a high heat conductor such as pure aluminum or aluminum alloy. Ideally, core layer 4 may be an Alclad aluminum which is a prebonded composite consisting of a core layer of an aluminum alloy bonded to outer layers of pure aluminum. The core layer 4 is then bonded to outer layers 6 of stainless steel.

In the art of composite cookware manufacture, it is well-known to utilize many different combinations of materials to make the composite, ranging from the very basic three-layer composite sheet 2 shown in FIG. 1 to upwards of nine or more layers as shown in U.S. Pat. No. 4,167,606 to Ulam, which is incorporated herein by reference. Other multi-layer composite cookware constructions are disclosed in U.S. Pat. Nos. 3,952,938 and 4,246,045 to Ulam and U.S.

Pat. No. 3,966,426 to McCoy et al., all of which are also incorporated by reference herein.

The present invention is in no way limited in its application by the number of layers of materials in the composite sheet 2. The only requirement is that one or more inner layers comprising aluminum or aluminum alloy materials be present for treatment according to the invention.

The composite multi-layer sheet 2 of whatever configuration (but containing at least one inner aluminum layer) is then formed into a desired configuration of cookware 10, the edge 8 of which is shown in FIG. 2. The cookware 10 is typically deep drawn by means and techniques well-known in the art. The edge 8 is formed around the outer perimeter of the cookware 10, usually by a shearing tool to expose the edges of the stainless steel layers 6 and the aluminum core layer 4.

The formed cookware vessel 10 with the sheared edge 8 having the exposed edge of the aluminum core layer 4 is then treated using a micro-arc oxidation process, whereby a hard protective layer 8 of aluminum oxide or $Al_2O_3$ is formed along the exposed edge of the aluminum core layer 4. The protective layer 8 of $Al_2O_3$ is ceramic in nature and possesses high hardness and resistance to chemical attack.

The micro-arc oxidation process in itself is known and one presently-practiced method is disclosed in U.S. Pat. No. 6,197,178 to Patel et al., the contents of which are incorporated by reference herein. The micro-arc oxidation process is commercially available and presently practiced by Micro Plasmic Corporation of Peabody, Massachusetts and further described at <www.microplasmic.com>. Another commercial enterprise which presently practices the micro-arc oxidation process is Mofra Tech under the trademarked "ALTIM TD®" process and further described on their web site <www.mofratech.com>. The contents of the Micro Plasmic Corporation and Mofra Tech web sites are also incorporated by reference herein.

The layer 8 of $Al_2O_3$ is of sufficient thickness to provide wear resistance and resistance to attack from strong alkaline working detergents or other chemical cleaning agents so as to protect the underlying core layer(s) 4 of aluminum and/or aluminum alloy.

Method of Protecting the Stainless Steel

My invention also contemplates a method for protecting the exterior stainless steel layer of the cooking utensil from the electrolyte during the micro arc oxidation process. The exposed surfaces of stainless steel are protected by rubber masking or the like to protect the base metal against chemical attack during the process. Such masking techniques are well-known in the anodizing and wet plating art.

It will be appreciated by those skilled in the art that the method of the present invention provides an economical and cosmetically pleasing solution to the problem of aluminum edge erosion in cookware, particularly in non-round cookware shapes. Having described the invention in very basic terms and examples, the scope and spirit of the present invention is in no way intended to be limited by this description. Accordingly, the invention is to be accorded its full scope of protection under the patent laws.

The invention claimed is:

1. A method of manufacturing cookware comprising the steps of:
    (a) providing a bonded composite sheet of material having at least one layer of an aluminum, aluminum alloy or Alclad aluminum material bonded between layers of stainless steel;
    (b) forming a cookware vessel of a desired configuration having said aluminum, aluminum alloy or Alclad aluminum exposed at least at an edge portion of said formed cookware vessel; and
    (c) treating at least said exposed edge of aluminum, aluminum alloy or Alclad aluminum by a micro arc oxidation process to form an $A_2O_3$ coating on at least said exposed edge of aluminum, aluminum alloy or Alclad aluminum whereby chemical corrosion/erosion of said exposed edge by caustic cleaning agents is prevented.

2. Cookware made according to the method of claim 1, comprising:
    a bonded composite sheet of material having at least one layer of an aluminum, aluminum alloy or Alclad aluminum material bonded between layers of stainless steel, formed in the shape of a cookware vessel of a desired configuration having said aluminum, aluminum alloy or Alclad aluminum extending to at least at an edge portion around an outer perimeter of said cookware vessel, wherein said edge of aluminum, aluminum alloy or Alclad aluminum is covered by an $Al_2O_3$ coating applied by micro arc oxidation, whereby chemical corrosion/erosion of said edge by caustic cleaning agents is prevented.

3. The method of claim 1 wherein the bonded composite sheet of material includes at least two layers of aluminum, aluminum alloy or Alclad aluminum bonded respectively between layers of stainless steel.

4. The method of claim 1 wherein the method includes the step of masking the stainless steel prior to said treating step.

* * * * *

UNITED STATES PATENT AND TRADEMARK OFFICE
CERTIFICATE OF CORRECTION

| | | |
|---|---|---|
| PATENT NO. | : 7,168,148 B2 | Page 1 of 1 |
| APPLICATION NO. | : 10/804813 | |
| DATED | : January 30, 2007 | |
| INVENTOR(S) | : Groll | |

It is certified that error appears in the above-identified patent and that said Letters Patent is hereby corrected as shown below:

<u>Column 4</u>, Line 23, Claim 1, "an $A_2O_3$ coating" should read -- an $Al_2O_3$ coating --

Signed and Sealed this

Twelfth Day of June, 2007

JON W. DUDAS
*Director of the United States Patent and Trademark Office*